United States Patent
Slack et al.

(10) Patent No.: US 10,982,711 B2
(45) Date of Patent: Apr. 20, 2021

(54) ADJUSTABLE-LENGTH BAIL EXTENSION

(71) Applicant: NOETIC TECHNOLOGIES INC., Edmonton (CA)

(72) Inventors: Maurice William Slack, Edmonton (CA); Matthew Allen, Edmonton (CA); Mark Sheehan, Edmonton (CA); Kyle Morrill, Edmonton (CA); Victor Yung, Edmonton (CA)

(73) Assignee: Noetic Technologies Inc., Edmonton (CA)

( * ) Notice: Subject to any disclaimer, the term of this patent is extended or adjusted under 35 U.S.C. 154(b) by 0 days.

(21) Appl. No.: 16/663,828

(22) Filed: Oct. 25, 2019

(65) Prior Publication Data
US 2020/0056649 A1     Feb. 20, 2020

Related U.S. Application Data

(63) Continuation-in-part of application No. PCT/CA2019/000052, filed on Apr. 29, 2019.
(Continued)

(51) Int. Cl.
*E21B 19/06* (2006.01)
*F16C 7/06* (2006.01)

(52) U.S. Cl.
CPC ............... *F16C 7/06* (2013.01); *E21B 19/06* (2013.01)

(58) Field of Classification Search
CPC .................................. E21B 19/06; F16C 7/06
See application file for complete search history.

(56) References Cited

U.S. PATENT DOCUMENTS 3,736,010 A * 5/1973 Larkin ............... F16C 7/06
                                        403/104
3,866,650 A * 2/1975 Larkin ............... F16C 7/06
                                        411/285
(Continued)

FOREIGN PATENT DOCUMENTS

EP        0079846 A1    5/1983
EP        0317661 A1    5/1989
(Continued)

OTHER PUBLICATIONS

International Preliminary Report on Patentability (Chapter II) re PCT/CA2019/000052, issued by the IPEA/CA on Mar. 9, 2020, and incorporating formal response to Written Opinion of the ISA/CA and claim amendments under PCT Article 34, as filed on Feb. 27, 2020 in conjunction with Demand for International Preliminary Examination.

(Continued)

*Primary Examiner* — Matthew R Buck
(74) *Attorney, Agent, or Firm* — Donald V. Tomkins

(57) ABSTRACT

An adjustable-length bail extension includes a tubular outer link member, an inner link member axially movable within the bore of the outer member, and an adjustment mechanism for releasably clamping the outer member to the inner member at any of multiple locking positions defined by sets of locking grooves formed at axial intervals on the inner member. The adjustment mechanism is operable between a locked position wherein a collet assembly linked to the outer member engages a selected locking groove set and thereby enables axial load transfer between the inner and outer members; and an unlocked position wherein the collet assembly does not lockingly engage any locking grooves, such that the inner member is axially movable within the outer member to enable adjustment of the overall length of (Continued)

the adjustable-length bail extension by repositioning the collet assembly to engage the inner member at a different locking position.

24 Claims, 14 Drawing Sheets

Related U.S. Application Data

(60) Provisional application No. 62/663,823, filed on Apr. 27, 2018.

(56) References Cited

U.S. PATENT DOCUMENTS

| | | | |
|---|---|---|---|
| 4,524,484 A | | 6/1985 | Graham |
| 4,948,149 A | | 8/1990 | Lin et al. |
| 5,983,455 A | * | 11/1999 | Polzin ................. B05C 17/0205 |
| | | | 15/144.4 |
| 6,520,709 B1 | | 2/2003 | Mosing et al. |
| 7,000,905 B1 | | 2/2006 | Lutter et al. |
| 7,140,443 B2 | | 11/2006 | Beierbach et al. |
| 7,293,763 B2 | | 11/2007 | Lutter et al. |
| 9,080,396 B2 | * | 7/2015 | Overland ................. E21B 19/07 |
| D768,471 S | | 10/2016 | Marquez |
| 9,556,690 B1 | | 1/2017 | Marquez |
| 9,732,567 B2 | | 8/2017 | Hayes |
| 10,624,447 B1 | * | 4/2020 | Manning ................. A46B 13/02 |
| 2004/0189028 A1 | | 9/2004 | Newman et al. |
| 2011/0013971 A1 | * | 1/2011 | Peng ....................... F16B 7/149 |
| | | | 403/109.1 |
| 2013/0028656 A1 | | 1/2013 | Lu |
| 2017/0284438 A1 | | 10/2017 | Stoldt et al. |
| 2017/0370165 A1 | | 12/2017 | Lutgring et al. |
| 2018/0283427 A1 | | 10/2018 | Stoldt |

FOREIGN PATENT DOCUMENTS

| | | |
|---|---|---|
| GB | 2390407 A | 1/2004 |
| WO | 8102182 A1 | 8/1981 |

OTHER PUBLICATIONS

VariLINK Adjustable Bail Extensions (VLS-1.0) [online], Volant, Aug. 2018 (Retrieved from <https://www.volantproducts.ca/resources/varilink/?pdf=VariLINK>.
International Search Report re PCT/CA2019/000052 dated Jul. 10, 2019.
ALCO brochure, "ALCO Adjustable Bail Extensions".
Forum B + V Oil Tools GmbH, Instruction Manual, May 2016.
Written Opinion of the International Searching Authority re PCT/CA2019/000052 dated Jul. 10, 2019.

* cited by examiner

ADJUSTABLE-LENGTH BAIL EXTENSION

FIELD

The present disclosure relates in general to adjustable-length structural components capable of carrying axial loads at multiple working lengths. More particularly, the present disclosure relates to adjustable extensions for the bails of pipe elevators conventionally used to handle tubulars during the drilling and casing of oil and gas wells.

BACKGROUND

Until recently, the use of power tongs in coordination with drilling rig hoisting systems was the established method for installing tubular strings (e.g., drill strings and casing strings) in petroleum wells. This method allows such tubular strings, comprising pipe segments (or "joints") with mating threaded ends, to be assembled relatively efficiently using power tongs as the means for screwing the pipe joints' threaded ends together to form threaded connections between sequential joints as they are added to the string being assembled and installed in a wellbore (i.e., "make-up" operations); or, conversely, for unscrewing threaded connections to remove joints to disassemble a string being pulled from a wellbore (i.e., "break-out" operations). This method requires two independent systems—namely, power tongs for make-up and break-out operations, and a drilling rig hoisting system for hoisting and lowering the casing string.

Modern drilling rigs commonly utilize a top drive, which has a primary purpose of enabling the efficient drilling of petroleum wells, and which until recently has been under-utilized during casing-running operations (i.e., installing a tubular casing string into a wellbore). Top-drive-equipped drilling rigs have enabled a new method for running casing, using tools commonly known as casing running tools (or "CRTs"). These tools are adapted to be mounted to and suspended from the top drive quill and to grip the upper end of a tubular casing joint, and to provide a seal between the bore of the gripped casing joint and the bore of the top drive quill. In coordination with the top drive, CRTs support both make-up and break-out operations as well as both hoisting and lowering of the casing string, thereby eliminating the need to use power tongs for casing make-up and break-out operations.

The top drive provides two load paths capable of supporting the weight of a tubular string and components thereof. During drilling operations (including "drilling with casing" operations), the weight of the tubular drill string is carried by the top drive via the top drive quill, which is typically designed to support the full weight of the drill string. During make-up and break-out operations, the weight of individual joints being added to or removed from a tubular string is transferred to the top drive via a pair of "ears" provided on opposite sides of the top drive, in conjunction with a conventional pipe elevator fitted with a pair of links (also commonly referred to as "bails"). Each link (or bail) is formed with an "eye" at each end, with one eye configured for swiveling engagement with one of the ears on the top drive, and with the other eye configured for swiveling engagement with the elevator, so that the top drive can be used to add a tubular joint carried by the elevator to a tubular string being assembled during make-up operations, or to remove a joint from the string during break-out operations.

Accordingly, the use of CRTs allows the top drive quill to carry the full weight of a casing string, so that the bails and elevator do not need to carry the full weight of the string as in conventional operations without CRTs. The bails and elevator still serve the important function of hoisting casing joints from the vee-door at the rig floor into the drilling rig structure in preparation for assembly into the casing string. The top drive is traditionally equipped with comparatively short bails that are designed for drilling operations; i.e., the lower ends of the bails are near the top drive quill. The mounting of a CRT and associated accessories onto the top drive quill makes it necessary either to replace the bails used for drilling operations with longer bails for casing running, which can be expensive and time consuming, or to add extensions to the drilling bails, which is both faster and less expensive than replacing the drilling bails.

Bail extensions must be long enough to ensure that there will be clearance between the CRT and the casing joint carried by the elevator, but excessive clearance can lead to difficulties stabbing the CRT into the casing joint. The appropriate length for bail extensions in a given case will depend on a number of variable factors, including the length of the particular CRT being used and any accessories mounted in association with it, such as crossover subs required to mate the CRT to the top drive quill, and additional equipment that may be mounted between the quill and CRT such as a torque monitoring sub. Because of all of these variables, there is no single bail extension length that will be practically usable in all operational circumstances.

The variability of the required bail extension length has been addressed in the prior art by means, including:
- single suitable-length bail extensions chosen for operationally-specific circumstances, and used to extend each drilling rig bail, such as disclosed in U.S. Pat. No. 9,732,567 and U.S. Publication No. 2018/0283427;
- multiple links and/or link connectors used to extend each drilling rig bail, such as disclosed in U.S. Pat. No. 9,556,690 and U.S. Publication No. 2017/0284438; and
- Multi-piece bail extensions that can be disassembled and re-assembled in different lengths used to extend each drilling rig bail, such as disclosed in U.S. Pat. No. 6,520,709.

Such exemplary prior art means for enabling variability of bail extension length necessitate a large number of bail extension components being kept near the drilling rig, with correspondingly large associated logistical requirements and costs.

An alternative means for enabling variability of bail extension length is the use of adjustable-length bail extensions. Some prior art adjustable-length bail extensions use one or more threaded connections to permit length adjustment, such as disclosed in International Publication No. WO 1981/002182. Adjusting such threaded connections is time-consuming when the adjustment distance is large compared to the thread pitch.

Other prior art adjustable-length bail extensions have telescoping components with matching transverse holes, such as disclosed in WO 1981/002182 and U.S. Pat. No. 9,080,396, so that the telescoping components can be rigidly coupled at discrete axial positions by means of bolts or pins inserted through matching transverse bolt holes. However, this type of connection has an undesirably low load efficiency (where the load efficiency is defined as the ratio of the axial load capacity of the connection to the basic axial load capacity of the telescoping components), due to the telescoping components' loss of transverse cross-sectional area and resultant stress concentration at the bolt holes. Therefore, the bolted or pinned connection between the telescoping components limits their load capacity, so they need to be oversized and heavier than would otherwise be necessary, thus making the manufacture, transportation, and handling of such variable-length bail extensions more difficult.

In other fields where telescoping components are used for length adjustment, persons skilled in the art will be familiar with the use of collet-type locking mechanisms that allow length adjustment when in an unlocked position and that rigidly connect the telescoping components when in a locked position. The telescopic component gripped by the collet-type mechanism commonly has a constant cross-sectional shape and a smooth surface. When the mechanism is in the unlocked position, length adjustment requires little force for relative movement of the telescoping components. When the mechanism is in the locked position, axial load is transferred between the telescoping components primarily through friction. To transfer large axial load through friction, the action of locking the collet-type mechanism must generate large radial force between the collet and the gripped component, which requires the operator to use hand tools or power tools. Accordingly, variable-length bail extensions using such prior art collet-type locking mechanism would require the use of hand tools or power tools for adjustment.

FIGS. 2 and 4 in European Publication No. 0317661 disclose collet-type locking mechanisms for telescoping windsurfing wishbone booms in which the collet tongues (element 6) of the inner sleeves (element 2) each have a bulge-shaped thickening (elements 9 and 18) that engage annular locking recesses (elements 10) formed on the outer surface of the inner boom (element 8). This engagement increases the capacity of the mechanism to transfer axial load between the inner boom (8) and the inner sleeve (2) via the tongues (element 6). Some axial load is also transferred through the contact between the tongues (6) and the tapered end section (element 11) of the outer sleeves (elements 3 and 20). The tapered end section (11) has a shallow (i.e., small) taper angle to generate a large radial clamping force of the tongues (6) on to the inner boom (8) and prevent relative movement between the inner and outer booms. The shallow taper angle also limits the amount of axial load that is transferred through the outer sleeves (3, 20).

Variable-length bail extension using a prior art mechanism such as that shown in EP 0317661 must be made from high-strength, high-stiffness materials (such as steel instead of plastic) to be of a practical size for carrying the weight of a tubular casing joint and lifting it in a controlled manner. As the collet tongues (6) carry a large portion of the axial load, they must have large cross-sectional areas. As a result, the axial force required to adjust the telescoping length and/or the torque on the outer sleeves (3, 20) required to lock and unlock the mechanism will be high and will require the use of hand tools or power tools, unless the collet tongues are very long.

BRIEF SUMMARY OF THE DISCLOSURE

The present disclosure teaches embodiments of bail extensions that can be adjusted in length to accommodate the variations in link length requirements that are inherent in CRT operations. These adjustable-length bail extensions use an adjustment mechanism that has a higher load efficiency than conventional adjustable bail extensions, therefore making the adjustable-length bail extensions lighter in weight than conventional adjustable bail extensions with comparable hoist capacity. The adjustment mechanism is compact and can be operated by hand without need for any hand or power tools. Except for a tethered locking pin, no components of the adjustable-length bail extensions need to be removed to adjust the length of the extensions, thus eliminating the risk of loose parts being accidentally dropped and lost down a well during the adjustment process, resulting in costly downtime.

In general terms, an adjustable-length bail extension in accordance with the present disclosure comprises the following components:
- an elongate tubular outer link member having a bore, an open lower end, plus an upper end that carries a link adaptor (for connecting to an existing link suspended from a top drive);
- an elongate inner link member (which may be either a tubular member or a solid bar) having a lower end that carries an elevator adaptor (for connecting to a mounting "ear" on a conventional pipe elevator), plus an upper end that is axially movable within the bore of the outer link member; and
- an adjustment mechanism carried by the outer link member, for securely and releasably clamping the outer link member to the inner link member at a selected one of a plurality of locking positions defined by annular grooves, provided either as single annular grooves or sets of annular grooves, formed at discrete axial intervals on a circumferential surface of the inner link member.

The adjustment mechanism is operable between:
- a locked position, in which the adjustment mechanism engages a selected annular groove (or set of annular grooves) on the inner link member to prevent relative axial movement of the inner and outer link members, and to enable the transfer of axial load between the inner and outer link members; and
- an unlocked position, in which the adjustment mechanism does not operatively engage any of the annular grooves on the inner link member, such that the inner link member is axially movable within the outer link member, thus enabling adjustment of the length of the adjustable-length bail extension.

The adjustment mechanism includes a collet assembly comprising a collet base ring carrying a plurality of collet arms, each of which carries a collet finger configured for closely-mating engagement with the annular grooves on the inner link member. The collet assembly is positioned in coaxial alignment with the outer link member, with the collet base ring engaging the lower end of the outer link member. The collet assembly is axially compliant (i.e., has low axial stiffness) to facilitate prevention of excessive or undesirable axial load developing in the collet arms (as discussed in detail later herein). In some embodiments, the collet assembly is axially fixed relative to the outer link member, and optionally may be integral with the outer link member. The means for providing axial compliance in such embodiments may comprise collet arms made from a low stiffness material or may comprise collet arms made with a long flexible shape. In another embodiment, the collet assembly is physically separate from the outer link member, and is axially movable relative thereto within a selected range of travel (or "free play") to provide the desired axial compliance.

The adjustment mechanism also includes a generally cylindrical locking sleeve coaxially positioned around the outer link member so as to enclose the collet assembly, and coupled to the outer link member in a manner that allows axial displacement of the locking sleeve relative to the outer link member within a defined range, in order to enable operation of the adjustment mechanism between the locked and unlocked positions. The locking sleeve has an upper end (i.e., oriented toward the link adaptor end of the outer link member when the locking sleeve is mounted on the outer link member), a lower end, and a generally cylindrical bore.

Axial displacement of the locking sleeve relative to the outer link member may be enabled by a threaded connection between these components, but this is by way of non-limiting example only. Although a threaded connection is described and illustrated herein as the means for coupling the locking sleeve to the outer link member and enabling relative axial displacement therebetween, other functionally-effective alternative means could be used without departing from the scope of this disclosure (such as a so-called "breech lock" mechanism, to provide one example).

A lower region of the locking sleeve bore is contoured for closely-mating engagement with complementarily-contoured radially-outer surfaces on the collet fingers, so as to enable the transfer of axial load from the collet fingers to the locking sleeve, in a manner described below, when the adjustment mechanism is in the locked position.

When the adjustment mechanism is in the locked position, the collet fingers engage a selected annular groove (or set of annular grooves) on the inner link member, with the collet fingers' radially-outer surfaces matingly engaging the complementarily-contoured surfaces of the locking sleeve bore. The locking sleeve thus prevents radially-outward deflection of the collet fingers, thus allowing axial load to be securely transferred from the inner link member to the collet fingers (via engagement of the collet fingers with the annular grooves in the inner link member), from the collet fingers to the locking sleeve (via engagement of the mating profiled surfaces on the collet fingers and the locking sleeve bore), and from the locking sleeve to the outer link member (via the threaded connection between these components).

In order to change the overall length of the adjustable-length bail extension, the adjustment mechanism may be moved from the locked position to the unlocked position by rotating the locking sleeve and thereby axially displacing it relative to the outer link member and the collet assembly sufficiently to disengage the collet fingers from the contoured region of the locking sleeve bore, and thus enabling disengagement of the collet fingers from the annular grooves on the inner link member by radial flexure of the collet arms. Axial force (compressive or tensile as required) may then be applied to axially displace the inner link member relative to the outer link member, and thereby disengaging the collet fingers from the annular groove or grooves in the inner link member, in order to change the overall length of the adjustable-length bail extension.

As axial load is primarily transferred through the locking sleeve when the adjustment mechanism is in the locked position, the collet arms may be designed to be compact, and axially and radially compliant such that the forces required to operate the adjustment mechanism when in the unlocked position are low, such that the mechanism can be operated by hand without need for hand or power tools.

The collet assembly may be manufactured with the collet arms elastically biased in the radially-inward direction, so that the collet fingers will tend to engage the annular grooves that they pass over as the inner link member is being moved to a new position. However, such biasing of the collet arms preferably will not be stronger than reasonably necessary for engagement of the collet fingers in the annular grooves, to minimize the axial load that will need to be applied to the adjustable-length bail extension to dislodge the collet fingers and enable adjustment of the adjustable-length bail extension.

In a variant embodiment, the collet assembly may be manufactured with the collet arms having a neutral radial bias such that the collet fingers will not engage the annular grooves on the inner link member unless urged to do so as a result of the locking ring being tightened and thereby exerting a radial inward force component on the collet fingers. In this embodiment, the collet fingers will provide no resistance to relative axial displacement of the inner and outer link members when adjusting the overall length of the adjustable-length bail extension, which may be advantageous in cases where the adjustment mechanism is being operated with the adjustable-length bail extension in a horizontal orientation.

In order to protect against accidental axial displacement of the locking sleeve when the adjustment mechanism is in the locked position, a locking pin or locking bolt (or other functionally effective locking means) can be used for temporarily preventing excess rotation of the locking sleeve and resultant correlative excess axial movement toward the unlocked position. Such locking means preferably will be non-removable from the locking sleeve, such as by tethering it to the locking sleeve with a cable.

In some embodiments, the inner and outer links of the adjustable-length bail extension may have cylindrical outer surfaces at least in the regions where they will engage the adjustment mechanism. In such cases, the collet assembly will have a generally cylindrical configuration, with the collet fingers defining a generally cylindrical collet bore and configured to engage circular (i.e., annular) grooves on a cylindrical surface of the inner link. However, the scope of the present disclosure is not limited to such embodiments, and in variant embodiments at least portions of the inner and outer links could have non-cylindrical outer surfaces. For example, the portion of the inner link carrying grooves for engagement by the collet fingers could be non-circular in cross-section (e.g., rectilinear, polygonal, or oval) in cross-section, with the arrangement and configuration of the collet fingers adjusted accordingly.

The present disclosure describes and illustrates embodiments specifically configured for use in association with the links or bails of conventional pipe elevators used on drilling rigs in the oil and gas industry where tensile axial load is transferred. However, the teachings of the present disclosure can be readily adapted to other types of elongate structural components for which a length-adjustment capability may be desirable or necessary, and where compressive axial load is transferred. Non-limiting examples of such alternative applications include tubular struts in scaffolding systems, as well as shores and reshores used during the construction of multi-storey reinforced concrete buildings. A variant embodiment configured to transfer compressive axial load is also described in the present disclosure.

In general terms, the present disclosure teaches a variable-length structural element comprising:
  an elongate tubular outer member having a first end and a second end, with said first end of the outer member being open to a bore of the outer member;
  an elongate inner member having a first end and a second end, with said first end of the inner member being coaxially disposed within the bore of the outer member; and
  an adjustment mechanism coupled to the outer member and comprising inner member locking means, with the adjustment mechanism being operable between: (1) a locked position, in which the inner member locking means engages the inner member at a selected locking position on the inner member, so as to prevent relative axial movement of the inner and outer members and thus enable the transfer of axial load between the inner and outer members; and (2) an unlocked position, in which the inner member locking means does not prevent relative axial movement of the inner and outer members.

The inner member locking means comprises:

a collet assembly having a collet bore, wherein the collet assembly is coaxial with the outer member and comprises a collet base ring having a plurality of collet arms extending axially away from the first end of the outer member, and each collet arm has a collet finger configured for engagement with locking grooves formed on an outer surface of the inner member, wherein the collet assembly provides means for axial compliance such that axial load is primarily transferred by a cylindrical locking sleeve instead of by the collet arms and the inner member extends coaxially through the collet bore; and a cylindrical locking sleeve having a locking sleeve bore between an open first end and an open second end of the locking sleeve, wherein: (1) the locking sleeve coaxially surrounds the collet assembly, with a portion of the locking sleeve proximal to the second end coaxially overlapping the first end of the outer member, and with the first end of the locking sleeve extending beyond the first end of the outer member; (2) the locking sleeve is coupled to the outer member by locking sleeve coupling means allowing axial displacement of the locking sleeve relative to the outer member within a defined range, thereby to enable operation of the adjustment mechanism between the locked and unlocked positions; and (3) a region of the locking sleeve bore proximal to the first end of the locking sleeve is contoured for engagement with complementarily-contoured radially-outer surfaces on the collet fingers when the adjustment mechanism is in the locked position.

The collet bore may be generally cylindrical, with the locking grooves being annular grooves formed on a cylindrical outer surface of the inner member. In alternative embodiments, the outer surface of the inner member may be non-circular in the region of the inner member carrying the locking grooves.

The means for providing axial compliance may comprise an axial gap between the collet assembly and the outer member. In alternative embodiments, the means for providing axial compliance may be provided by manufacturing the collet arms from a compliant elastomeric material, or by making the collet arms in a long flexible shape.

The locking sleeve coupling means may be provided in the form of female (or "box") threads formed in the locking sleeve bore, and mating male (or "pin") threads formed on the outer member in the general vicinity of the first end of the outer member.

The locking mechanism may include axial constraint means for constraining axial movement of the locking sleeve relative to the outer member when the adjustment mechanism is in the locked position. Such axial constraint means may comprise a locking pin groove provided on an outer surface of the outer member, plus a transversely-oriented locking pin bore provided in the locking sleeve, for retractable insertion of a locking pin so as to engage the locking pin groove within a selected range of axial position corresponding to the locked position of the adjustment mechanism.

Alternatively, the axial constraint means could comprise set screws acting between the locking sleeve and the outer member or, more advantageously, could comprise threaded lock dogs mounted in the locking sleeve and engageable with lock dog pockets formed in an outer surface of the outer member, within a range of axial position selected to correspond to the locked position of the adjustment means, in a manner generally known in the art.

The inner member may be a solid bar or a tubular member, and in either case the inner member does not necessarily need to be circular in cross-section. As well, the tubular outer member does not necessarily need to be a round tube. However, in cases where the outer member is non-circular in cross-section, it may have an axisymmetric outer surface in any region requiring threads to be formed.

The present disclosure also teaches variable-length structural elements generally as described above, but configured for use as adjustable-length bail extensions in association with pipe elevators for purposes of make-up and break-out of tubular strings in the oil and gas industry.

BRIEF DESCRIPTION OF THE DRAWINGS

Embodiments of the invention will now be described with reference to the accompanying Figures, in which numerical references denote like parts, and in which.

DETAILED DESCRIPTION

Embodiments for Carrying Tensile Axial Load

Figure 1A:
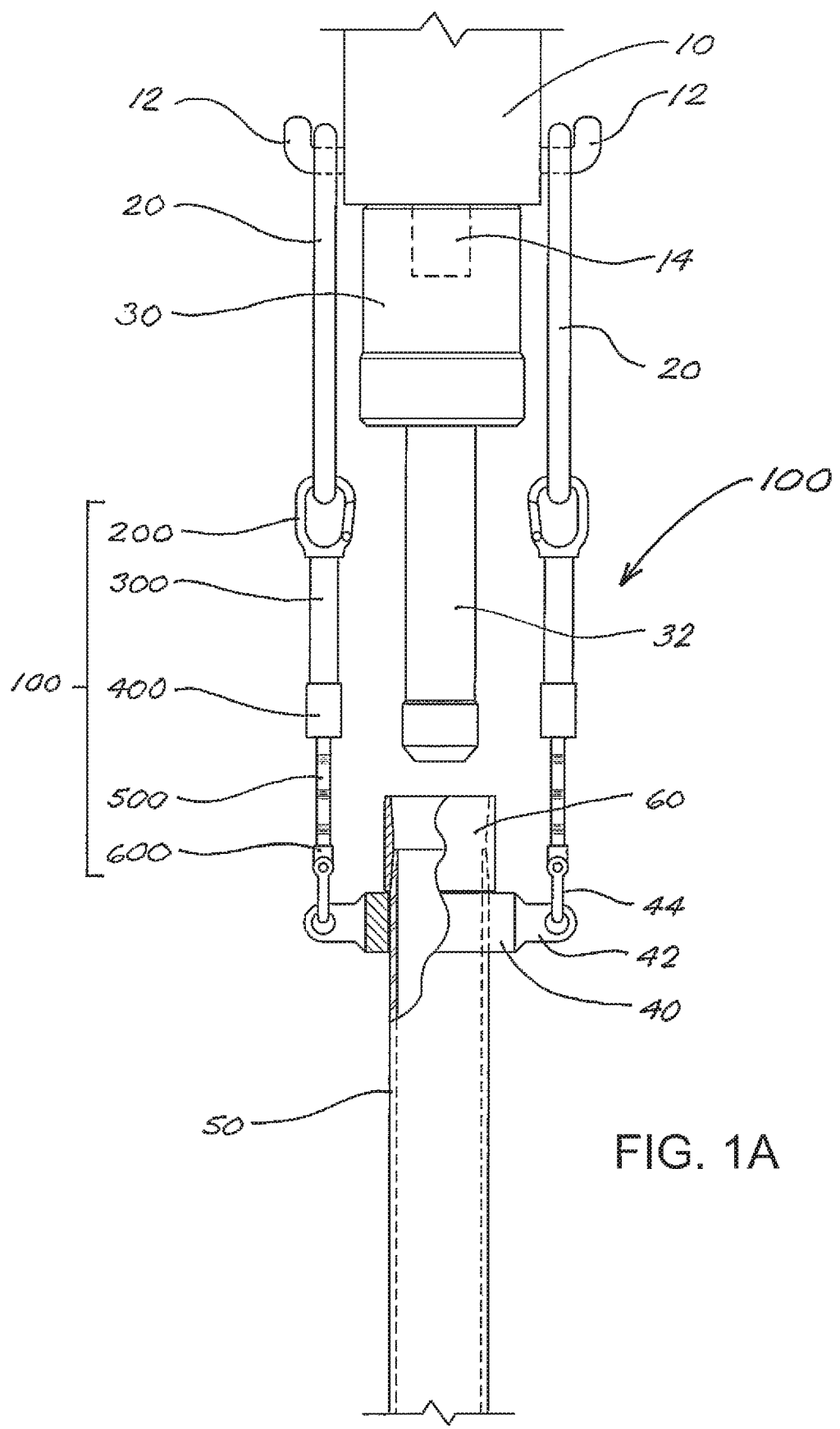
FIG. 1A is a schematic depiction of a top drive fitted with conventional pipe elevators, shown supporting a casing joint in conjunction with the use of adjustable-length bail extensions in accordance with the present disclosure.
Figure 1B:
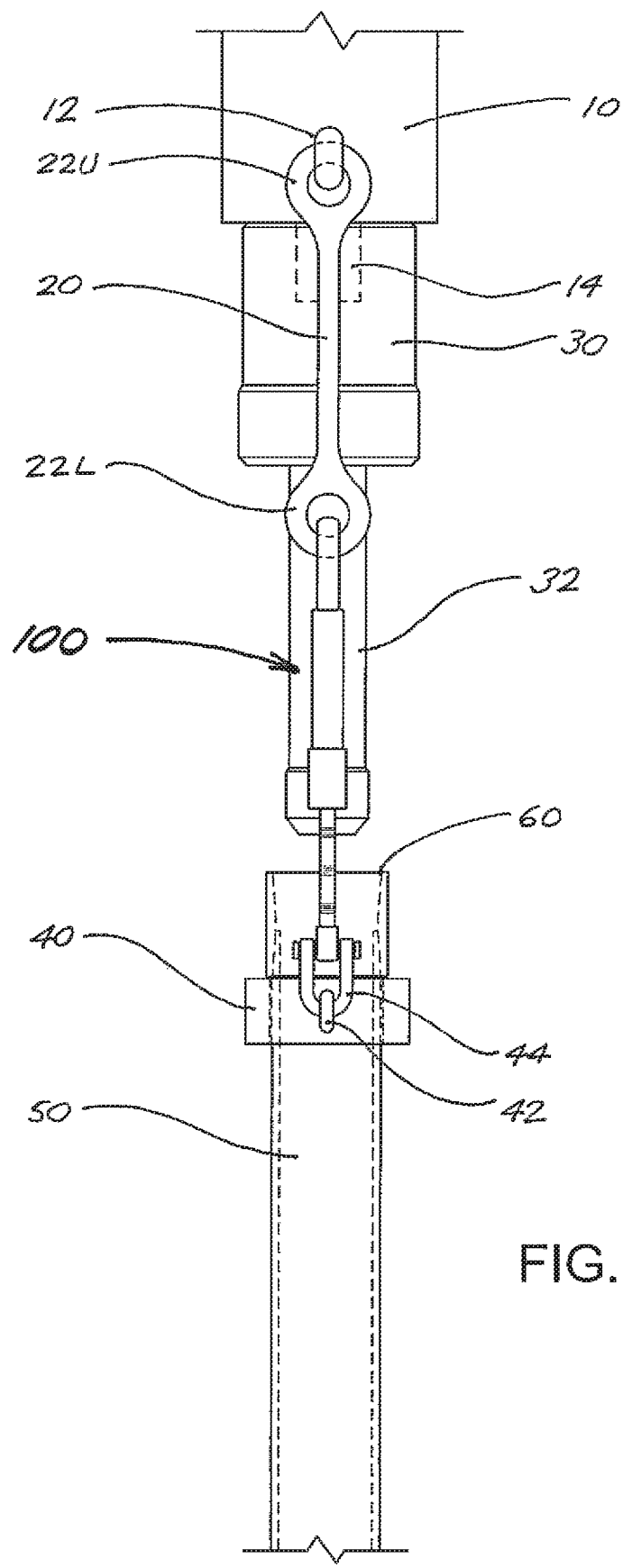
FIG. 1B is a side view of the equipment assembly shown in FIG. 1A.

In this patent document, the terms "upper", "lower", "upward", and "downward", when used in reference to components or features of the disclosed adjustable-length bail extension, or in reference to relative movements or displacement of components of the adjustable-length bail extension, are to be understood as corresponding to the vertical orientation of the bail extensions as depicted in FIGS. 1A and 1B.

FIGS. 1A and 1B schematically illustrate a typical equipment set-up for running tubulars such as casing joints into a wellbore (i.e., casing string make-up) or disassembling the casing string (i.e., break-out) using a top drive 10 having a top drive quill 14 shown supporting an internally-gripping casing running tool (CRT) 30 having a gripping assembly 32. Top drive 10 has a pair of "ears" 12 for supporting heavy one-piece conventional elevator links (or bails) 20 by means of upper link eyes 22U formed on the upper ends of conventional links 20. A conventional pipe elevator 40 is used to support a casing joint 50 being run into or out of the wellbore by positioning elevator 40 directly below a tubular coupling 60 threaded onto the upper end of casing joint 50. Pipe elevator 40 has a pair of ears 42 with holes for receiving devises 44 or other suitable hardware to engage lower link eyes 22L formed on the lower ends of conventional links 20.

It will be readily appreciated from FIGS. 1A and 1B that if CRT 30 (or other equipment of significant total vertical length) were not suspended from top drive quill 14, conventional links 20 would be able to directly engage elevator ears 42 as described above. However, because of the vertical length of CRT 30 (and perhaps additional associated components), links 20 in FIGS. 1A and 1B are too short to reach elevator 40. It typically will not be practical to remove the heavy conventional links 20 from top drive 10 and replace them with longer links, so extensions must be provided to make up the gap between lower link eyes 22L of links 20 and elevator ears 42. FIGS. 1A and 1B show adjustable-length bail extensions 100 in accordance with the present disclosure being used for this purpose.

Figure 2:
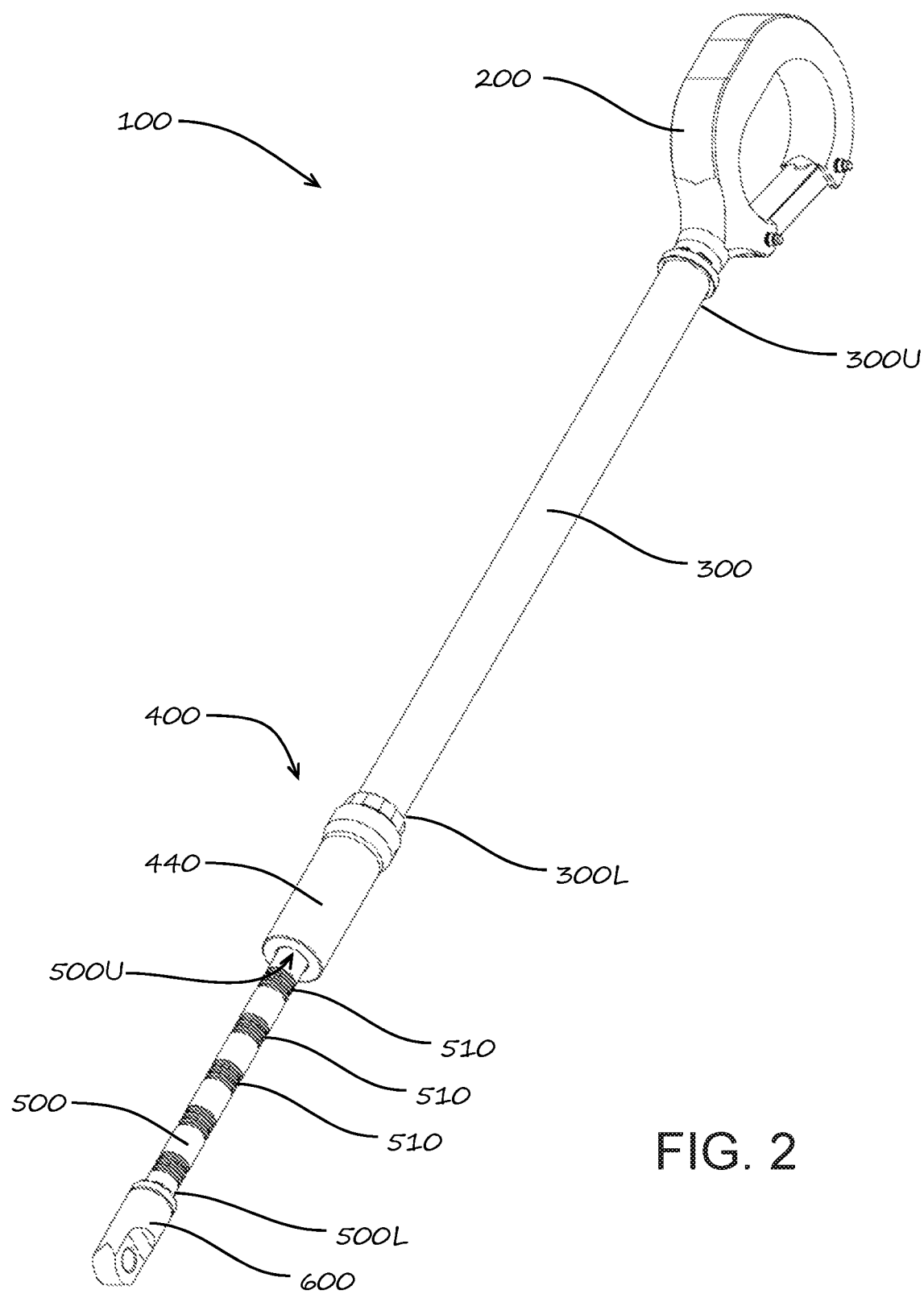
FIG. 2 is an isometric view of one embodiment of an adjustable-length bail extension in accordance with the present disclosure.

In the embodiment illustrated in FIG. 2, each of the two adjustable-length bail extensions 100 comprises:
- an elongate tubular outer link member (or "outer link") 300 having a bore 315, an open lower end 300L and an upper end 300U carrying a link adaptor 200;
- an elongate inner link member (or "inner link") 500 having a lower end 500L carrying an elevator adaptor 600; and
- an adjustment mechanism 400 carried by outer link 300, for releasably clamping outer link 300 to inner link 500 at a selected locking position on inner link 500.

In the illustrated embodiment, link adaptor 200 is shown as a carabiner-style shackle, but this is by way of non-limiting example only; link adaptor 200 could take other functionally-effective forms without departing from the scope of the present disclosure. Similarly, elevator adaptor 600 is shown as a solid connection piece having a hole for receive a bolt, cotter pin, or other suitable fastener, but could be provided in any other functionally-effective form.

When bail extensions 100 are used in a top drive operation as in FIGS. 1A and 1B, upper ends 300U of outer links 300 would be connected to lower link eyes 22L on conventional links 20 by means of link adaptor 200. Similarly, the lower ends 500L of inner links 500 would be connected to elevator ears 42 on pipe elevator 40 by means of elevator adaptor 600. Bail extensions 100 will typically be used only to support the weight of casing joints being added to or removed from a casing string. When the casing string is being lowered (during make-up operations) or raised (during break-out operations), the full weight of the casing string will be transferred directly to top drive 10 via CRT 30. Accordingly, bail extensions 100 will typically be subjected only to axial tension loads during normal operations, and because these tension loads will be comparatively small, bail extensions 100 do not need to be as heavy as conventional links.

Figure 3A:
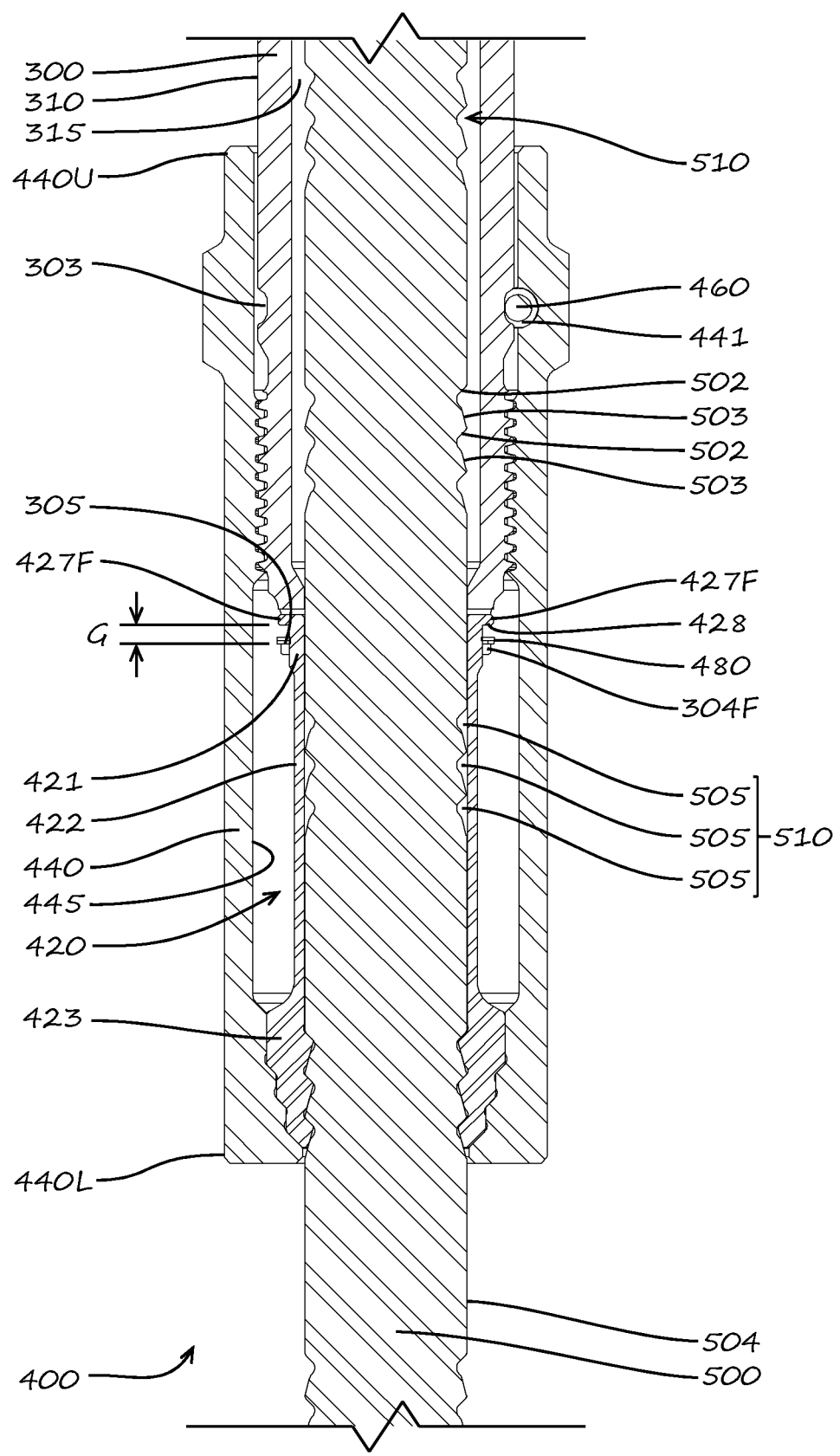
FIG. 3A is a longitudinal cross-section through one embodiment of an adjustment mechanism in accordance with the present disclosure, with the adjustment mechanism shown in the locked position.
Figure 3B:
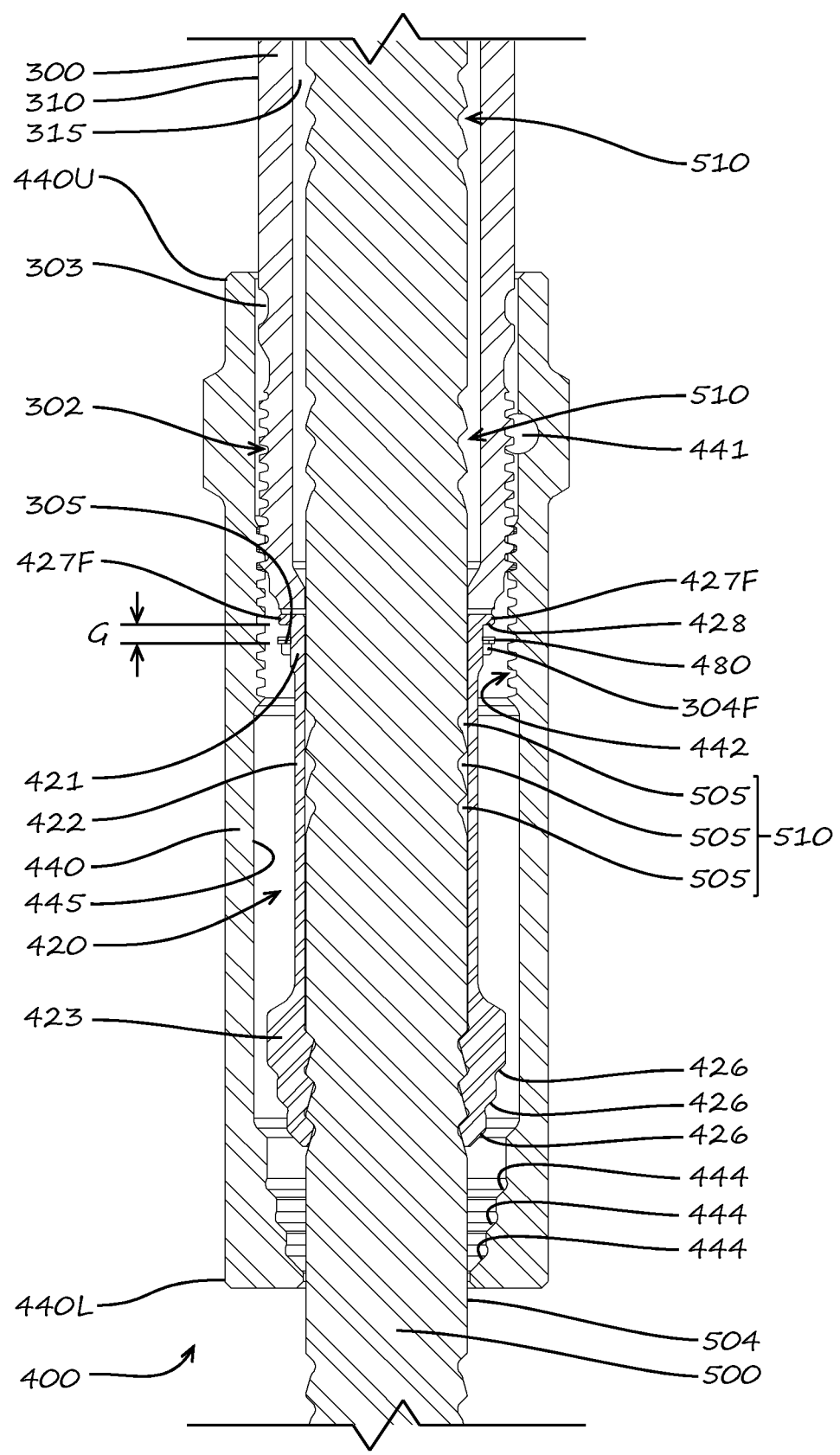
FIG. 3B is a longitudinal cross-section through the adjustment mechanism in FIG. 3A, with the adjustment mechanism shown in the unlocked position.

Outer link 300, adjustment mechanism 400, and inner link 500 are generally configured as a coaxially-nested group of close-fitting and generally cylindrical components. Adjustment mechanism 400 is operable between a locked position as shown in FIG. 3A and an unlocked position as shown in FIG. 3B. In the locked position, axial loads applied to bail extension 100 are transferred between outer link 300 and inner link 500 via adjustment mechanism 400, and the overall length of bail extension 100 does not change. In the unlocked position, inner link 500 may be partially extended from or partially retracted into outer link 300, to enable adjustment of the overall length of bail extension 100.

Figure 3C:
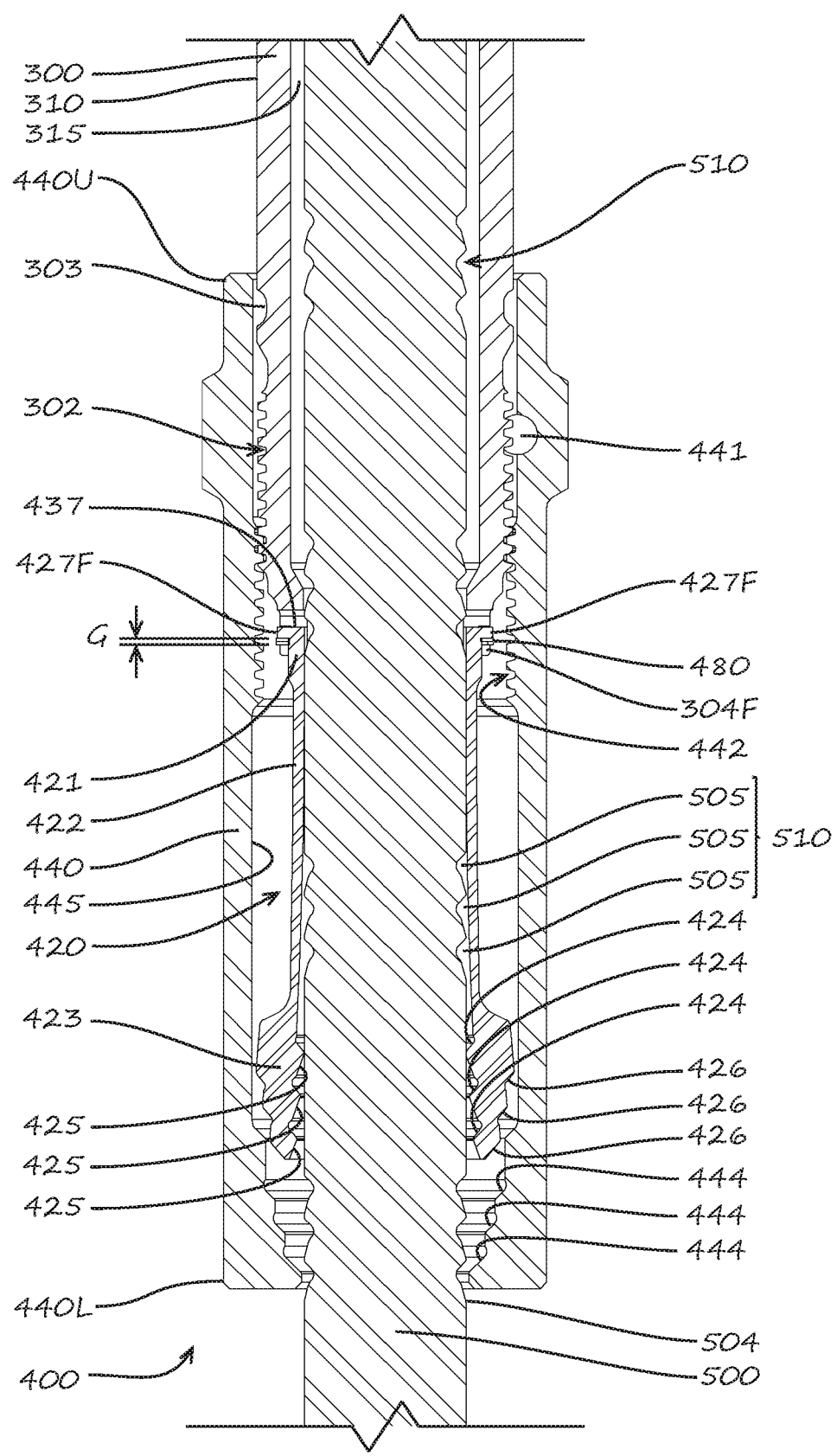
FIG. 3C is a longitudinal cross-section through the adjustment mechanism in FIGS. 3A and 3B, with the adjustment mechanism shown midway between the locked and unlocked positions.

In the embodiment shown in FIGS. 3A, 3B, and 3C, adjustment mechanism 400 comprises a collet assembly 420 having a collet bore 450, a locking sleeve 440, and a locking pin 460. Locking sleeve 440 has an upper end 440U, a lower end 440L, and a locking sleeve bore 445, and is coaxially mounted around outer link 300 so as to be axially movable relative to outer link 300. This functionality is provided in the illustrated embodiments by means of male (or "pin") threads 302 formed on a lower region of outer link 300 and mating female (or "box") threads 442 formed in an upper region of locking sleeve bore 445.

As shown in FIGS. 3A, 3B, 3C, and 4, collet assembly 420 has a collet base ring 421 with a plurality of collet arms 422 projecting downward from and uniformly spaced around collet base ring 421. Each collet arm 422 carries a collet finger 423 comprising a plurality of annular collet protrusions 429 projecting radially inward and forming a collet protrusion set 430. As best seen in FIG. 3C, each collet protrusion 429 has a collet extension flank 424 and a collet retraction flank 425. Each collet protrusion 429 is configured to fit closely into a corresponding one of a plurality of annular grooves 505 formed on an outer cylindrical surface 504 of inner link 500 and constituting an inner link groove set 510. As best seen in FIG. 3A, each annular groove 500 comprises an annular inner link extension flank 502 (which is engageable with collet extension flanks 424 on collet fingers 423) and an annular inner link retraction flank 503 (which is engageable with collet retraction flanks 425 on collet fingers 423). Multiple inner link groove sets 510 are provided at selected locking locations along inner link 500, defining the length adjustment intervals and total length adjustment range available for a given configuration of adjustable-length bail extension 100.

In the particular embodiment shown in FIGS. 3A, 3B, and 3C, the collet protrusion set 430 on each collet finger 423 has three identical annular collet protrusions 429, and each annular groove set 510 on inner link 500 has three identical annular grooves 505. However, this is by way of non-limiting example only. The number, size, and shape of annular grooves 505 and collet protrusions 429 may be selected to manage local stresses within component size constraints, and depending on these factors, it could be sufficient in some applications for each "set" of grooves or protrusions to comprise only one groove or protrusion. In some cases it may be desirable for the configurations of the collet protrusions and annular grooves in each collet protrusion set 430 and each groove set 510 to be different in order to ensure that only one engaged position will be possible. Similarly, annular groove set 510 need not be circular in cross-section. Where a non-circular cross section is selected, means to ensure rotational alignment between collet assembly 420 and inner link 300 may be provided.

Figure 4:
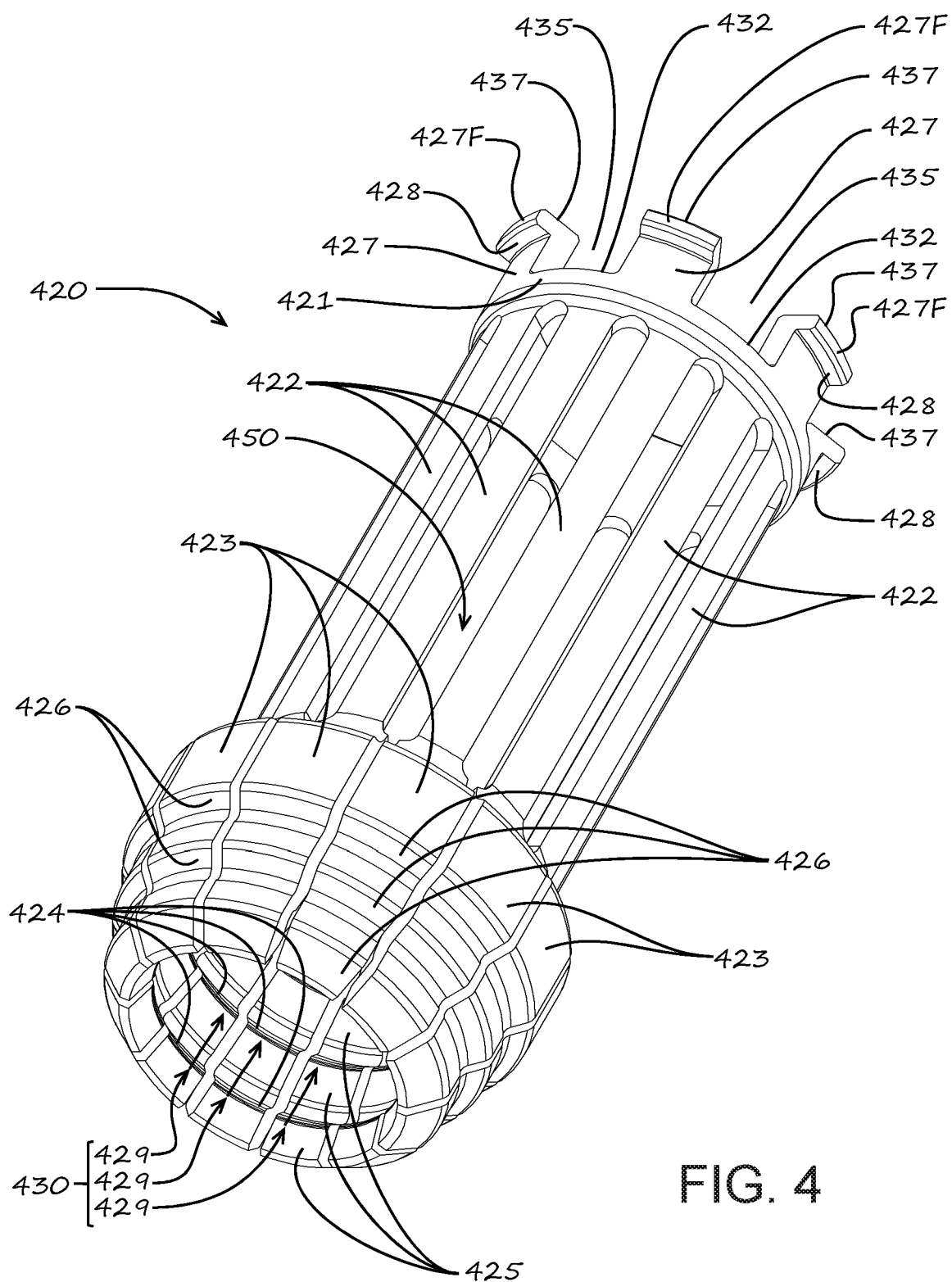
FIG. 4 is an isometric view of the collet assembly of the adjustable-length bail extension shown in FIG. 2.

As most clearly illustrated in FIGS. 3B, 3C, and 4, the radially-outer surface of each collet finger 423 is also configured to define a plurality of collet finger load flanks 426 that are engageable with locking sleeve load flanks 444 formed in a lower region of locking sleeve bore 445.

In the embodiment shown in FIG. 3C, collet arms 422 are designed to enable deflection under radial load to facilitate engagement of collet protrusion sets 430 in one of groove sets 510. It will be understood that the geometry of collet assembly 420, including the length, width, thickness, material, and number of collet arms 422, as well as the length and thickness of base ring 421, may be selected to define the load deflection response of collet arm 422. The application of tensile load (or "extension load") to increase the extension of inner link 500 relative to outer link 300 (and thus increase the length of adjustable-length bail extension 100) will cause collet extension flanks 424 and inner link extension flanks 502 to contact, and the geometry of such contact will induce radial load on collet fingers 423 urging radially-outward deflection of collet fingers 423. Similarly, the application of compressive load (or "retraction load") to retract inner link 500 further into outer link 300 (and thus to decrease the length of adjustable-length bail extension 100) will cause collet retraction flanks 425 and inner link retraction flanks 503 to contact, and the geometry of such contact will induce radially-outward load on collet fingers 423, urging corresponding radial deflection. The application of sufficient extension or retraction load accompanied by axial displacement with adjustment mechanism 400 in the unlocked position will cause collet protrusion set 430 to disengage from the previously-engaged inner link groove set 510, bringing collet protrusion set 430 into sliding contact with outer cylindrical surface 504 of inner link 500.

Referring now to FIG. 4, base ring 421 on collet assembly 420 has a plurality of base ring extensions 427 projecting upward from and uniformly spaced around base ring 421, forming base ring recesses 435 between adjacent base ring extensions 427, and upward-facing base ring shoulders 432 extending between adjacent base ring link extensions 427. A collet ring flange 427F extends radially outward from each base ring extension 427, and defines a downward-facing collet ring flange shoulder 428, such that all collet ring flange shoulders 428 lie in a common plane transversely perpendicular to the longitudinal axis of collet assembly 420. Similarly, each collet ring flange 427F defines an upward-facing collet ring flange face 437, such that all collet ring flange faces 437 lie in a common plane transversely perpendicular to the longitudinal axis of collet assembly 420.

Figure 5:
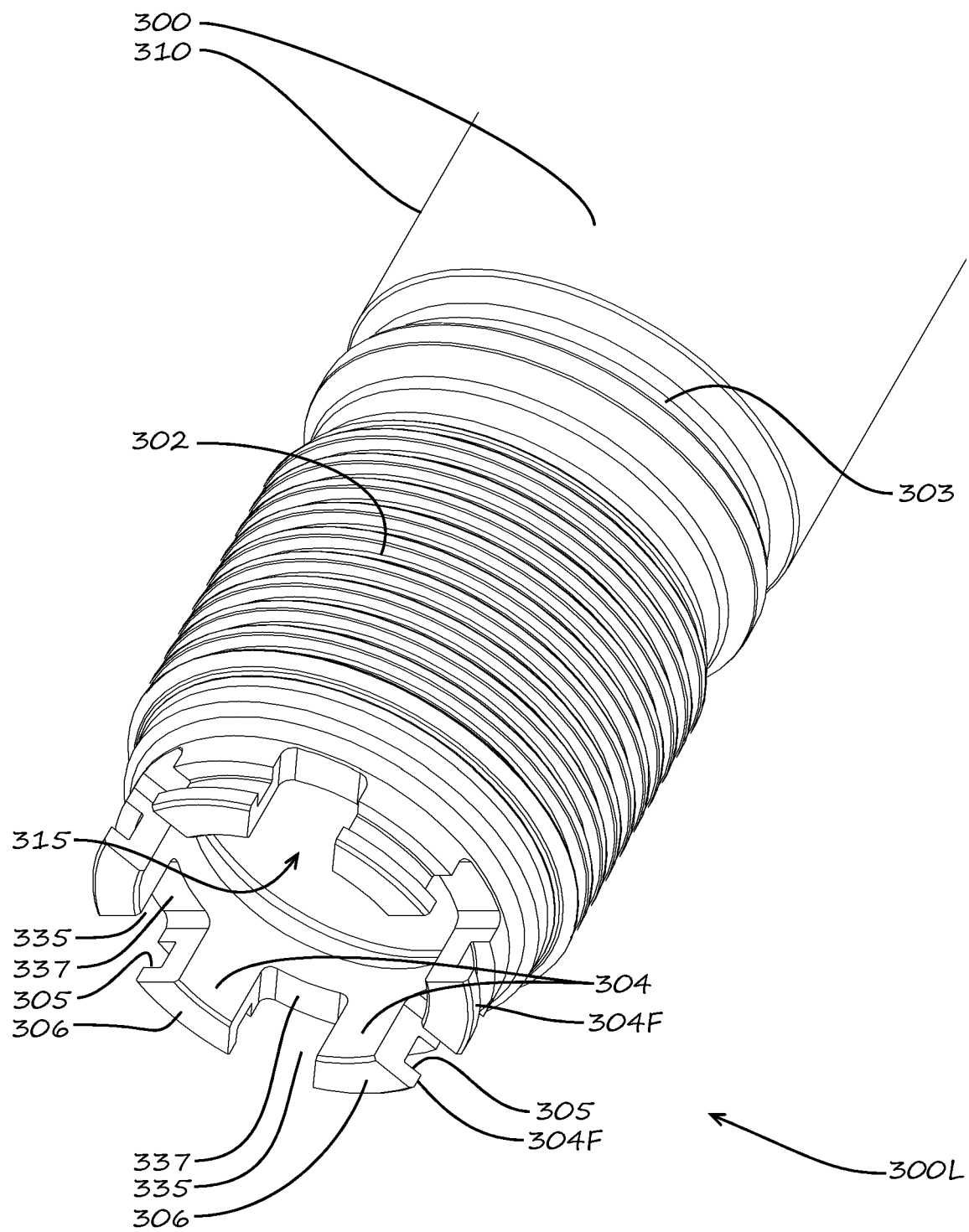
FIG. 5 is an isometric view of the lower portion of the outer link member end of the bail extension shown in FIG. 2.

Referring now to FIG. 5, outer link 300 has a plurality of outer link extensions 304 projecting downward from and uniformly spaced around lower end 300L of outer link 300, forming outer link wall recesses 335 between adjacent outer link extensions 304, and downward-facing outer link shoulders 337 extending between adjacent outer link extensions 304. An outer link flange 304F extends radially outward from each outer link extension 304, and has an upward-facing outer link flange shoulder 305, such that all outer link flange shoulders 305 lie in a common plane transversely perpendicular to the longitudinal axis of collet assembly 420. Similarly, each outer link flange 304F defines a downward-facing outer link flange face 306, such that all outer link flange faces 306 lie in a common plane transversely perpendicular to the longitudinal axis of collet assembly 420.

Referring back to FIGS. 3A, 3B, and 3C, it can be seen that when adjustment mechanism 400 is fully assembled and in the locked position, outer link extensions 304 project into corresponding base ring recesses 435 on collet assembly 420, and base ring extensions 427 on collet assembly 420 project into corresponding outer link wall recesses 335 such that the plane of the downward-facing collet ring flange shoulders 428 lies above the plane of the upward-facing outer link flange shoulders 305, forming an annular gap G between collet ring flange shoulders 428 and outer link flange shoulders 305. A collet retainer ring 480 is disposed within annular gap G, with the axial thickness of collet retainer ring 480 being less than the maximum axial length of annular gap G, such that collet retainer ring 480 resides within gap G in a relatively loose-fitting manner, thus providing collet assembly 420 with a range of axial movement relative to outer link 300. This range of axial movement is alternatively referred to as "free play", and represents means by which the collet assembly provides axial compliance between the collet fingers and lower end 300L of outer link member 300.

The application of tensile axial load reacted through collet fingers 423 of collet assembly 420 will tend to cause annular gap G to decrease so as in the limit to sandwich collet retainer ring 480 between collet ring flange shoulders 428 and outer link flange shoulders 305, as may be seen in FIG. 3C, thereby effectively transferring the tensile axial load directly into outer link 300.

Similarly, compressive axial load applied to collet assembly 420, will tend to cause annular gap G to increase to a limit at which upward-facing base ring shoulders 432 will contact corresponding downward-facing outer link flange faces 306, thereby effectively transferring the compressive axial load into outer link 300 or, alternatively, at which upward-facing collet ring flange faces 437 will contact corresponding downward-facing outer link shoulders 337, depending on the specific configurations of the related components. It is also possible to configure these components such that both limit conditions will occur simultaneously—i.e., with base ring shoulders 432 contacting corresponding outer link flange faces 306 at the same time as collet ring flange faces 437 contact corresponding outer link shoulders 337.

Accordingly, neither tensile nor compressive axial load applied through collet fingers 423 can be transmitted to outer link 300 via collet arms 422 except when collet assembly 420 is at a limit of its free play.

FIG. 3A shows adjustment mechanism 400 in the locked position with locking sleeve 440 threadingly engaging outer link 300 as previously described, such that in the illustrated embodiment, right-hand (i.e., clockwise) rotation of locking sleeve 440 relative to outer link 300 will cause locking sleeve 440 to move upward relative to outer link 300, and left-hand (i.e., counter-clockwise) rotation of locking sleeve 440 relative to outer link 300 will cause locking sleeve 440 to move downward relative to outer link 300. Locking pin 460 is shown disposed within locking sleeve pin hole 441 so as to engage a circumferential locking pin groove 303 formed on a cylindrical outer surface 310 of outer link 300, and thereby to prevent unintended back-off of locking sleeve 440 when adjustable-length bail extension 100 is in use.

To move locking mechanism 400 to the unlocked position, locking pin 460 can be withdrawn or retracted from locking sleeve pin hole 441, and then locking sleeve 440 can be rotated counter-clockwise to free collet fingers 423 from the previously-engaged annular groove set 510. Although locking pin 460 is shown as a straight pin, this is by way of non-limiting example, as this component can be provided in any functionally-effective form without departing from the intended scope of the present disclosure. In some cases, for further example, locking pin 460 could be provided in the form of an eccentric pin that is rotationally adjustable between an engaged position and a disengaged position without being removed from locking sleeve 400, thereby eliminating the risk of locking sleeve pin hole 441 being lost and perhaps even being inadvertently dropped down the borehole or casing string.

In the illustrated embodiment, axial compliance is provided between collet fingers 423 and lower end 300L of outer link member 300 by means of the free play provided with respect to collet assembly 420 relative to outer link 300 being greater than the axial displacement that locking pin 460 is permitted within locking sleeve pin hole 441 relative to locking sleeve 440. This feature ensures that contact will be maintained between collet finger load flanks 426 and locking sleeve load flanks 444, and that the transfer of tensile hoisting loads from inner link 500 to collet assembly 420 will always be transferred via collet finger load flanks 426 and not via collet arms 422, thereby allowing collet arms 422 to be designed to allow radial deflection of collet fingers 423 during adjustment independent of the axial load to be transferred through bail extensions 100 when the adjustment mechanism is locked.

Figure 6:
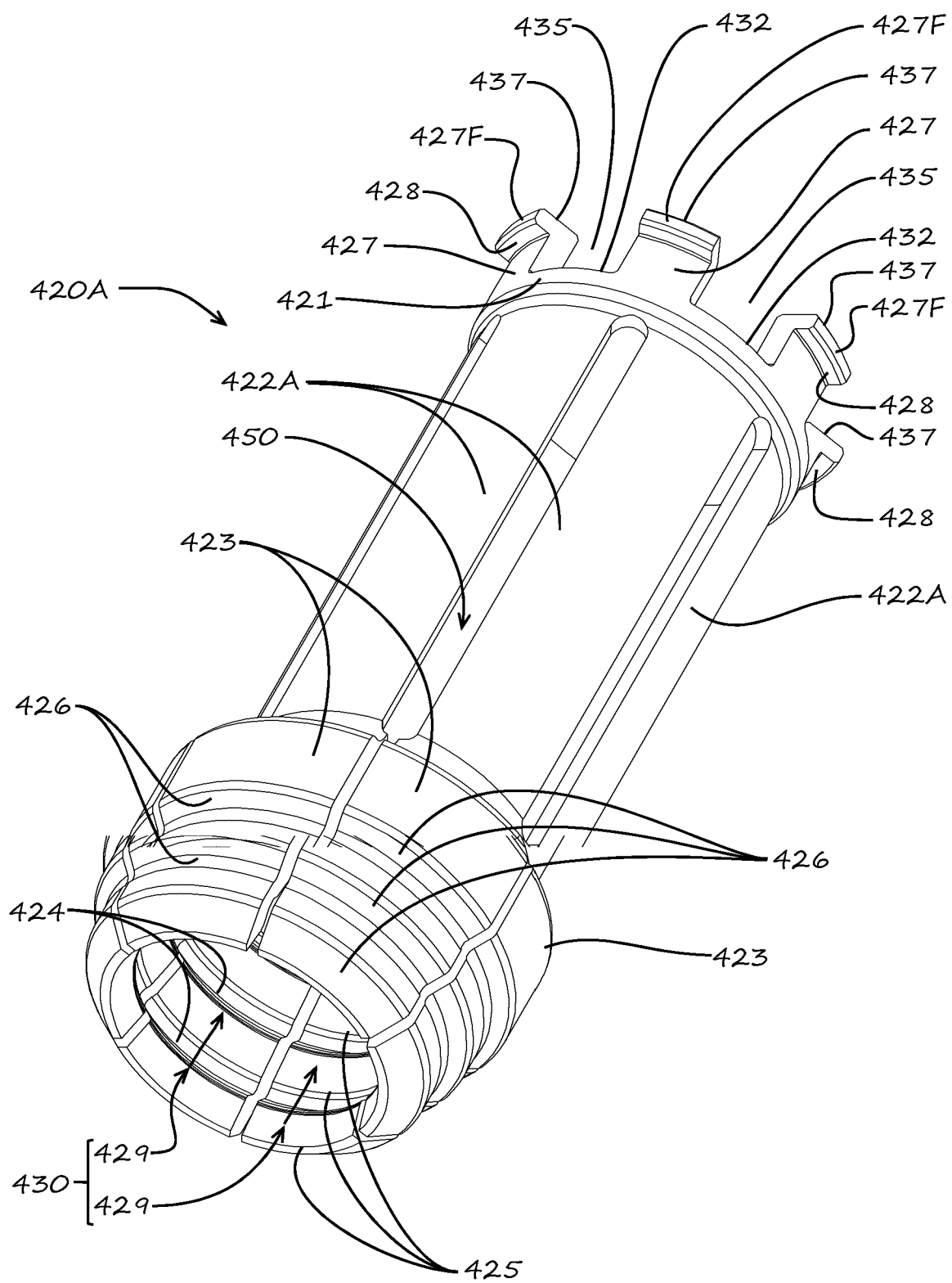
FIG. 6 is an isometric view of a first variant of the collet assembly of the adjustable-length bail extension shown in FIG. 2.
Figure 7:
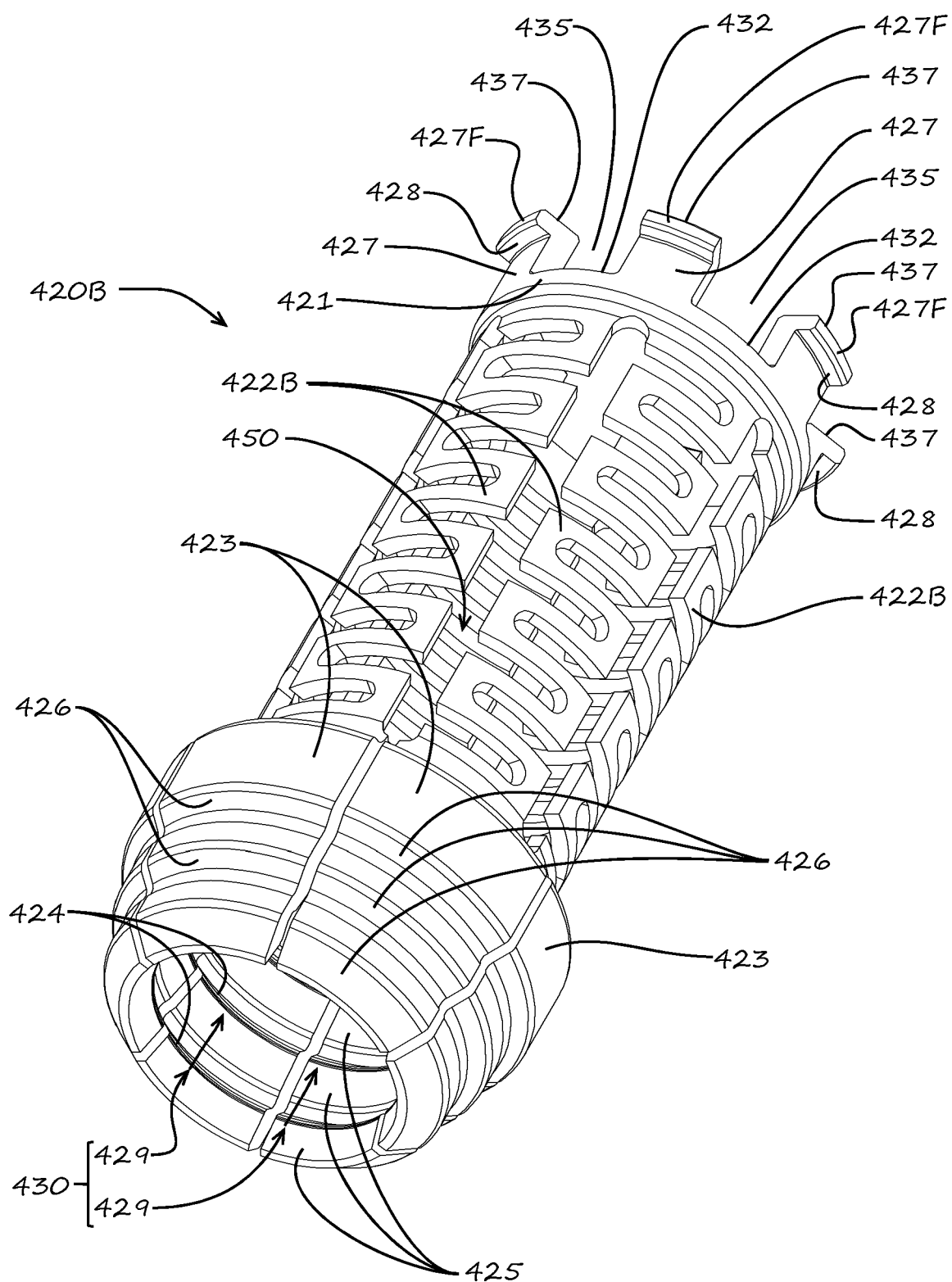
FIG. 7 is an isometric view of a second variant of the collet assembly of the adjustable-length bail extension shown in FIG. 2.

FIGS. 6 and 7 illustrate alternative embodiments of collet assemblies having different means for providing axial compliance between collet fingers 423 and lower end 300L of outer link member 300. Collet assembly 420A in FIG. 6 provides axial compliance by using collet arms 422A made from a compliant material such as an elastomer. Base ring 421 and collet fingers 423 may be made from a high-strength, high-stiffness material such as steel, and bonded to elastomer collet arms 422A. Collet assembly 420B in FIG. 7 provides axial compliance by manufacturing collet arms 422B in the shape form of long flexible springs of serpentine configuration. Collet arms 422B may be made from the same material as base ring 421 and collet fingers 423. Collet arms 422A or 422B may be designed such that a change in axial length equal to the permissible axial displacement of locking pin 460 within locking sleeve pin hole 441 relative to locking sleeve 440 plus the axial length change of locking sleeve 440 under axial loading of adjustable-length bail extension 100 will not cause plastic deformation of the collet arms.

Referring specifically to FIGS. 3A and 3B, it can be seen that the relative axial positions of collet finger load flanks 426 and locking sleeve load flank 444 will define the two operational positions of adjustment mechanism 400, as follows:

In the locked position (as illustrated in FIG. 3A), collet finger load flanks 426 engage locking sleeve load flanks 444, and locking pin 460 is disposed within locking sleeve pin hole 441 in locking sleeve 440 so as to engage locking pin groove 303 on outer link 300. Radial deflection of collet fingers 423 due to the application of hoist load is constrained by the closely-mating engagement of collet fingers 423 with locking sleeve 440, enabling the transfer of axial load in sequence from inner link 500 to collet fingers 423 and then to locking sleeve 440 and ultimately to outer link 300.

In the unlocked position (as illustrated in FIG. 3B), collet finger load flanks 426 are disengaged from locking sleeve load flanks 444, and locking pin 460 has been removed or retracted from locking sleeve pin hole 441. The application of sufficient extension load or retraction load will cause radial deflection of collet fingers 423, thereby enabling axial movement of collet protrusion sets 430 between inner link groove sets 510.

The process of adjusting the overall length of adjustable-length bail extension 100 may be summarized as follows:

Starting from the locked position (as in FIG. 3A), locking pin 460 is removed from locking sleeve pin hole 441, and locking sleeve 440 is rotated counter-clockwise and thus is displaced downward relative to outer link 300, until adjustment mechanism 400 is in the unlocked position (as in FIG. 3B). Extension load or retraction load can then be applied as required to extend or retract inner link 500 relative to outer link 300 to move collet finger protrusion sets 430 into operative engagement with a selected annular groove set 510 on inner link 500 and thereby to increase or reduce the overall length of adjustable-length bail extension 100 as desired.

Locking sleeve 440 is then rotated clockwise until locking sleeve pin hole 441 is axially aligned with locking pin groove 303 on outer link 300, thereby restoring adjustment mechanism 400 to the locked position (as in FIG. 3A), whereupon locking pin 460 is inserted into locking sleeve pin hole 441 to prevent subsequent inadvertent excess counter-clockwise rotation and the correlative risk of axial movement of locking sleeve 440 out of the locked position. As previously noted, alternative means for constraining excess axial movement of locking sleeve 440 when in the locked position could be provided in the form of set screws acting between locking sleeve 440 and outer link 300, or by threaded lock dogs mounted in locking sleeve 440 and engageable with lock dog pockets formed in outer link 300.

Embodiments for Carrying Compressive Axial Load

Figure 8A:
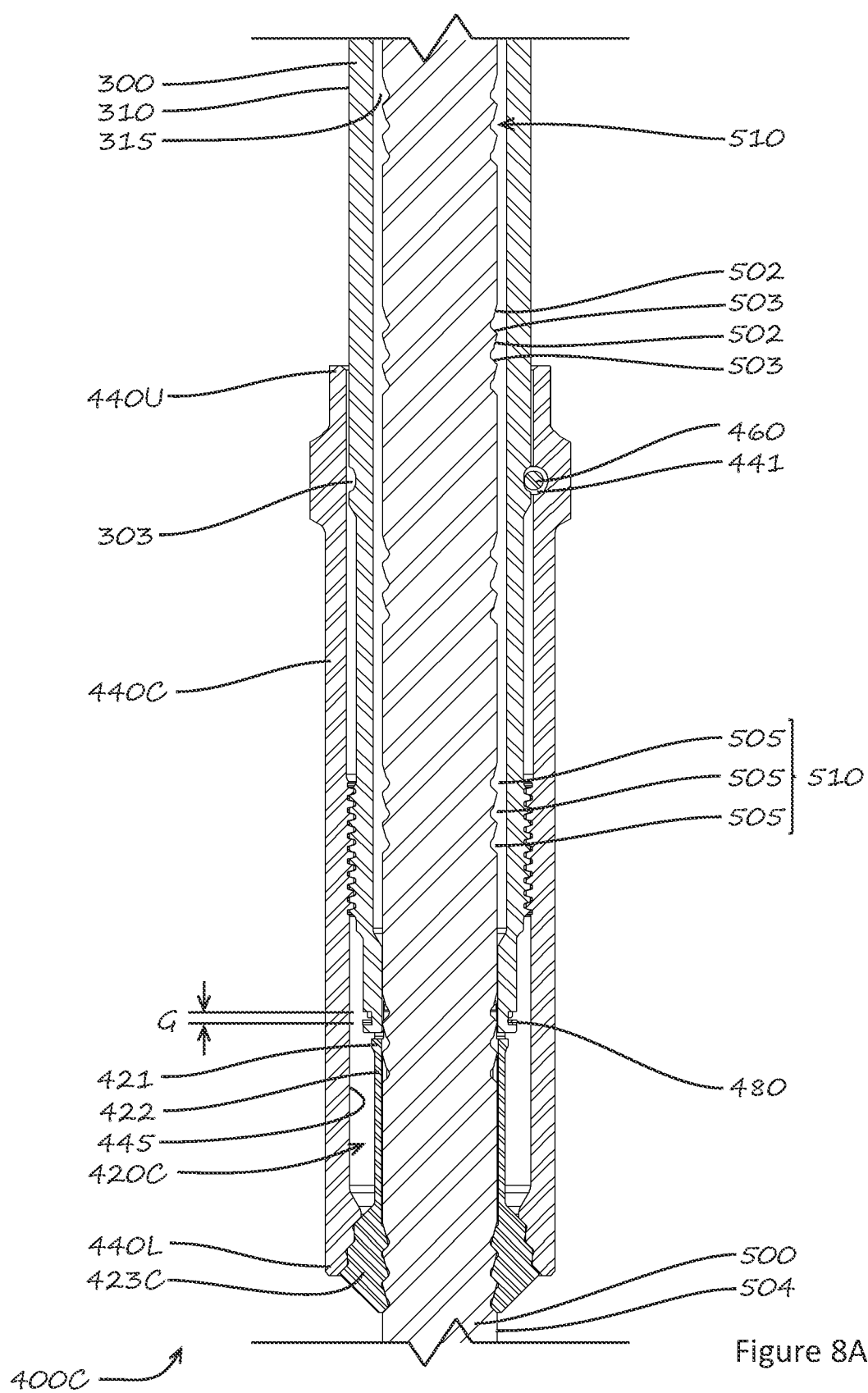
FIG. 8A is a longitudinal cross-section through the adjustment mechanism of another embodiment of an adjustable-length structural component in accordance with the present disclosure for applications requiring transfer of compressive axial load, with the adjustment mechanism shown in the locked position.
Figure 8B:
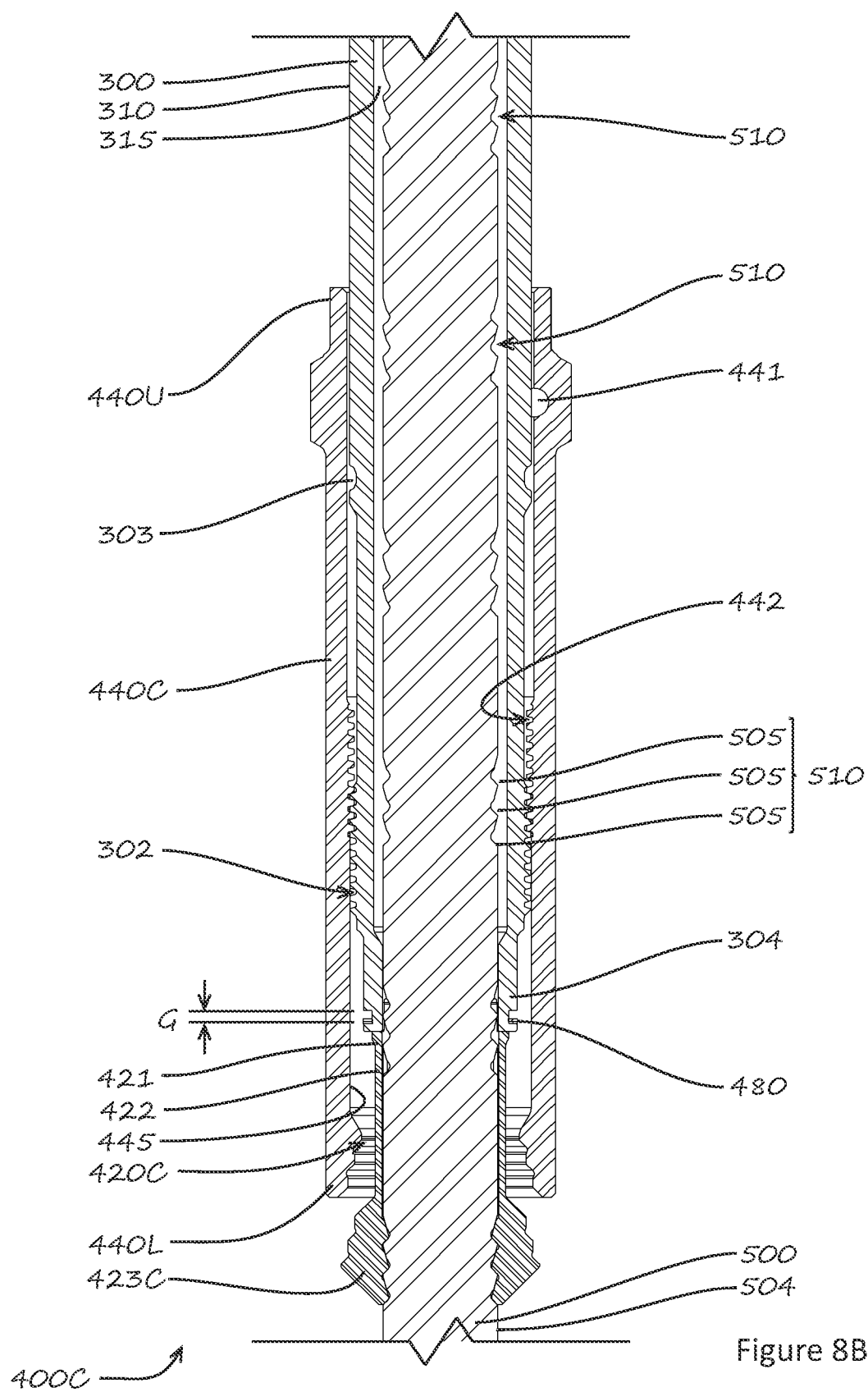
FIG. 8B is a longitudinal cross-section through the adjustment mechanism shown in FIG. 8A, with the adjustment mechanism shown in the unlocked position.
Figure 9:
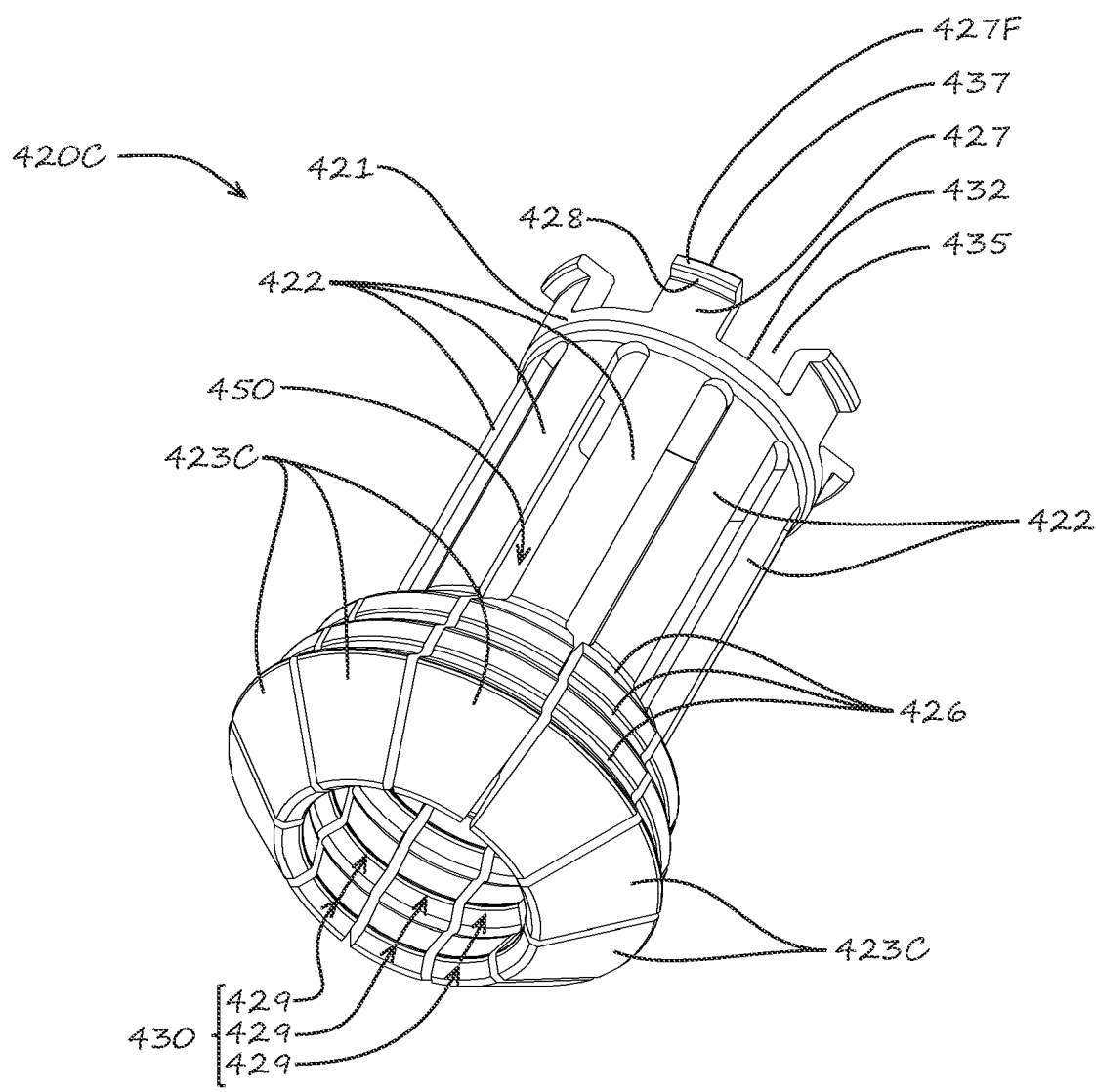
FIG. 9 is an isometric view of the collet assembly of the adjustment mechanism shown in FIGS. 8A and 8B.
Figure 10:
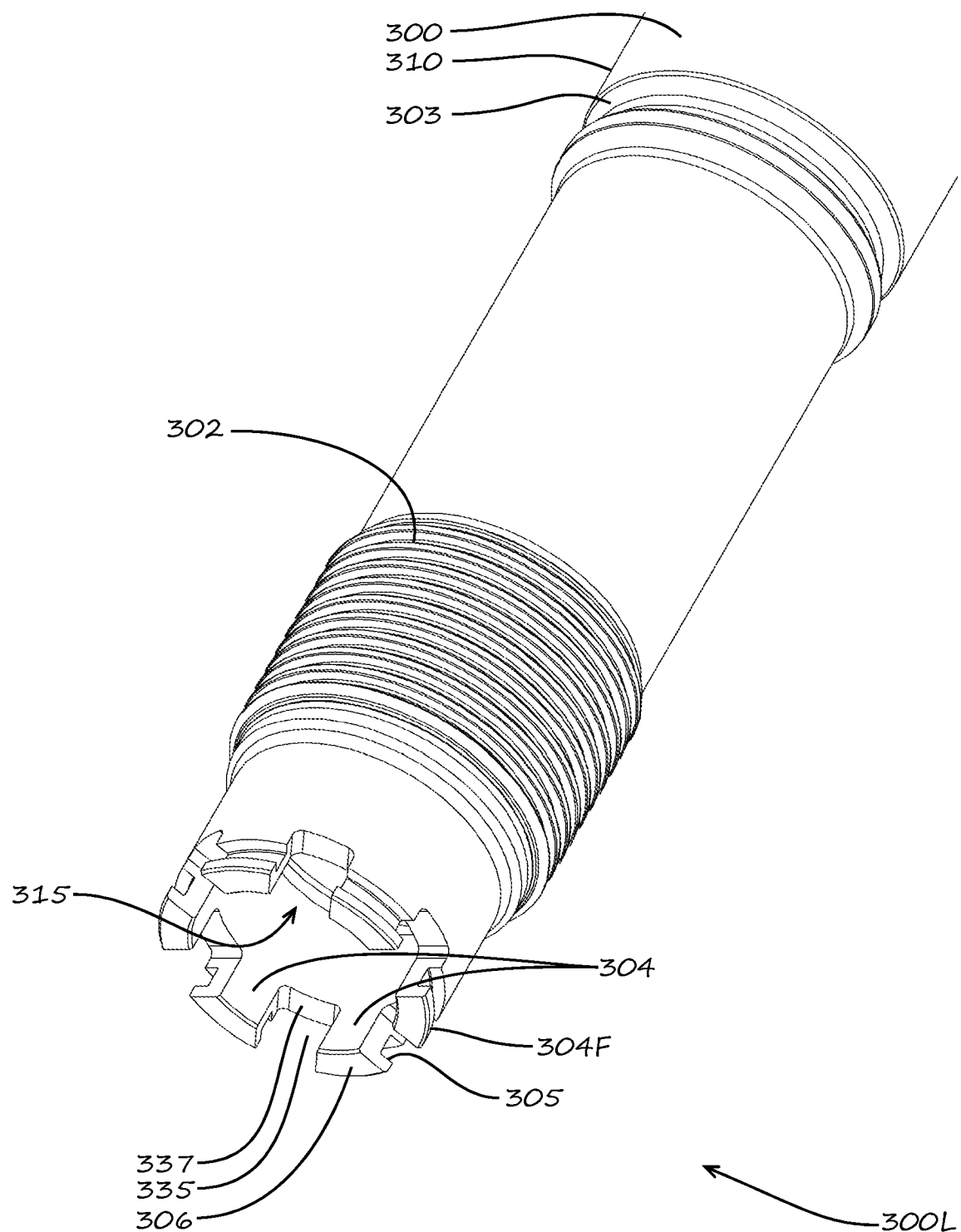
FIG. 10 is an isometric view of the first end of the outer member of the adjustable-length structural component shown in FIG. 8A.

The teachings of the present disclosure can be readily adapted to structural components for which a length-adjustment capability may be desirable or necessary, and where compressive axial load is transferred. The variant embodiment adjustment mechanism 400C shown in FIGS. 8A, 8B, 9 and 10 is configured to transfer compressive axial load. FIG. 8A shows adjustment mechanism 400C in the locked position, and FIG. 8B shows adjustment mechanism 400C in the unlocked position. Adjustment mechanism 400C is generally similar to adjustment mechanism 400 illustrated in FIGS. 3A, 3B, 3C, 4, and 5, except that it is configured to carry compressive axial load instead of tensile axial load. Accordingly, various components of adjustment mechanism 400C generally correspond to analogous components in adjustment mechanism 400 (and share the same reference numbers as for adjustment mechanism 400), with the notable exceptions that (1) collet assembly 420C has collet fingers 423C, and (2) locking sleeve 440C has lower end 440L shaped to efficiently transfer compressive axial load instead of tensile axial load.

It will be readily appreciated by those skilled in the art that various modifications to embodiments in accordance with the present disclosure may be devised without departing from the scope of the present teachings, including modifications that use equivalent structures or materials hereafter conceived or developed.

It is especially to be understood that the scope of the present disclosure is not intended to be limited to described or illustrated embodiments, and that the substitution of a variant of a claimed or illustrated element or feature, without any substantial resultant change in functionality, will not constitute a departure from the scope of the disclosure.

For example, it is not essential for outer link 300 to be positioned above inner link 500 as illustrated in the Figures (although that arrangement may be most convenient in many applications). In variant embodiments, outer link 300 could be positioned below inner link 500, with the lower end of outer link 300 carrying elevator adaptor 600, and with the upper end of inner link 500 carrying link adaptor 200, and all such variant embodiments are intended to be covered by the present disclosure.

In this patent document, any form of the word "comprise" is to be understood in its non-limiting sense to mean that any element or feature following such word is included, but elements or features not specifically mentioned are not excluded. A reference to an element or feature by the indefinite article "a" does not exclude the possibility that more than one such element or feature is present, unless the context clearly requires that there be one and only one such element or feature.

Any use herein of any form of the terms "connect", "engage", "couple", "attach", or any other term describing an interaction between elements is not meant to limit the interaction to direct interaction between the subject elements, and may also include indirect interaction between the elements such as through secondary or intermediary structure.

Relational and conformational terms such as (but not limited to) "axial", "cylindrical", "circular", "non-circular", and "axisymmetric" are not intended to denote or require absolute mathematical or geometrical precision. Accordingly, such terms are to be understood as denoting or requiring substantial precision only (e.g., "substantially coaxial" or "generally cylindrical") unless the context clearly requires otherwise.

Unless specifically noted otherwise, any reference to an element being "generally cylindrical" is intended to denote that the element in question would appear substantially cylindrical in transverse cross-section, although the cross-sectional configuration of the element may vary along its length.

Wherever used in this document, the terms "typical" and "typically" are to be understood and interpreted in the sense of being representative of common usage or practice, and are not to be understood or interpreted as implying essentiality or invariability.

What is claimed is:

1. A variable-length structural element comprising:
   (a) an elongate tubular outer member having a first end and a second end, with said first end of the outer member being open to a bore of the outer member;
   (b) an elongate inner member having a first end and a second end, with said first end of the inner member being coaxially disposed within the bore of the outer member; and
   (c) an adjustment mechanism coupled to the outer member and comprising an inner member locking means, wherein the adjustment mechanism is operable between:
      a locked position, in which the inner member locking means engages the inner member at a selected locking position on the inner member, so as to prevent relative axial movement of the inner and outer members and thus enable the transfer of axial load between the inner and outer members; and
      an unlocked position, in which the inner member locking means does not prevent relative axial movement of the inner and outer members;
   wherein the inner member locking means comprises:
   (d) a collet assembly having a collet bore, through which the inner member coaxially extends, and comprising: a collet base ring coaxially coupled to the first end of the outer member and carrying a plurality of collet arms extending axially away from the first end of the outer member, with each collet arm carrying a collet finger configured for engagement with locking grooves formed on an outer surface of the inner member; and axial compliance means, for enabling axial movement of the collet fingers relative to the first end of the outer member within the limits of a defined range of axial movement; and
   (e) a cylindrical locking sleeve having a locking sleeve bore between an open first end and an open second end of the locking sleeve, wherein:
      the locking sleeve coaxially surrounds the collet assembly, with a portion of the locking sleeve proximal to the second end of the locking sleeve coaxially overlapping the first end of the outer member, and with the first end of the locking sleeve extending beyond the first end of the outer member;
      the locking sleeve is coupled to the outer member by a locking sleeve coupling means allowing axial displacement of the locking sleeve relative to the outer member within a defined range, thereby to enable operation of the adjustment mechanism between the locked and unlocked positions;
      a region of the locking sleeve bore proximal to the first end of the locking sleeve is contoured for engagement with complementarily-contoured radially-outer surfaces on the collet fingers when the adjustment mechanism is in the locked position; and
      the limits of the range of axial movement of the collet fingers relative to the first end of the outer member are selected such that axial load applied through the collet fingers will be transmitted to the outer member primarily via the locking sleeve.

2. A variable-length structural element as in claim 1 wherein the collet bore is cylindrical, and wherein the locking grooves are annular grooves formed on a cylindrical outer surface of the inner member.

3. A variable-length structural element as in claim 1 wherein the outer surface of the inner member is non-circular in the region of the inner member carrying the locking grooves.

4. A variable-length structural element as in claim 1 wherein the locking sleeve coupling means includes a threaded connection comprising:

(a) box threads formed in a region of the locking sleeve bore proximal to the second end of the locking sleeve; and (b) pin threads formed on a region of the outer member proximal to the first end of the outer member.

5. A variable-length structural element as in claim 1, further comprising an axial constraint means for constraining axial movement of the locking sleeve relative to the outer member when the adjustment mechanism is in the locked position.

6. A variable-length structural element as in claim 5 wherein the axial constraint means comprises:

(a) a locking pin groove formed on an outer surface of the outer member; and (b) a transversely-oriented locking pin bore formed in the locking sleeve and positioned and configured to receive a locking pin such that the locking pin will engage the locking pin groove on the outer member and thereby will constrain axial movement of the locking sleeve relative to the outer member.

7. A variable-length structural element as in claim 1 wherein the collet arms are elastically biased in a radial direction relative to either the locked position or the unlocked position.

8. A variable-length structural element as in claim 7 wherein the radial direction is a radially-outward direction relative to the locked position.

9. A variable-length structural element as claim 1 wherein the outer member is non-circular in cross-section.

10. A variable-length structural element as in claim 4 wherein the outer member is non-circular in cross-section, but has an axisymmetric outer surface in the region carrying the pin threads.

11. A variable-length structural element as in claim 1 wherein the inner member is a solid bar.

12. A variable-length structural element as in claim 11 wherein the solid bar is a round bar.

13. A variable-length structural element as in claim 1 wherein the inner member is a tubular member.

14. A variable-length structural element as in claim 13 wherein the tubular member is a round pipe.

15. A variable-length structural element as in claim 1 wherein the axial compliance means comprises:

(a) a plurality of spaced outer link extensions projecting downward from the first end of the outer member, forming outer link wall recesses between adjacent outer link extensions, and downward-facing outer link shoulders extending between adjacent outer link extensions;

(b) an outer link flange extending radially outward from each outer link extension, wherein the outer link flange defines:

an upward-facing outer link flange shoulder, such that all outer link flange shoulders lie in a common plane transversely perpendicular to the longitudinal axis of the collet assembly; and a downward-facing outer link flange face, such that all outer link flange faces lie in a common plane transversely perpendicular to the longitudinal axis of the collet assembly;

(c) a plurality of base ring extensions extending upward from the base ring, forming base ring recesses between adjacent base ring extensions, and upward-facing base ring shoulders extending between adjacent base ring extensions;

(d) a collet ring flange extending radially outward from each base ring extension, wherein each collet ring flange defines:

a downward-facing collet ring flange shoulder, such that all of the collet ring flange shoulders lie in a common plane transversely perpendicular to the longitudinal axis of the collet assembly; and an upward-facing collet ring flange face, such that all of the collet ring flange faces lie in a common plane transversely perpendicular to the longitudinal axis of the collet assembly; and (e) a collet retainer ring;

wherein:

(f) the adjustment mechanism is assembled with the outer link extensions projecting into corresponding base ring recesses, and with the base ring extensions on the collet assembly projecting into corresponding outer link wall recesses, such that the plane of the downward-facing collet ring flange shoulders lies above the plane of the upward-facing outer link flange shoulders, forming an annular gap between the collet ring flange shoulders and the outer link flange shoulders; and (g) the collet retainer ring is disposed within the annular gap, such that the collet assembly is axially movable relative to the outer link between:

a first axial movement limit at which the collet retainer ring is sandwiched between the collet ring flange shoulders and the outer link flange shoulders; and a second axial movement limit at which the upward-facing base ring shoulders contact the corresponding downward-facing outer link flange faces, and/or the upward-facing collet ring flange faces contact the corresponding downward-facing outer link shoulders.

16. A variable-length structural element as in claim 1 wherein the axial compliance means is provided by forming the collet arms from a compliant material.

17. A variable-length structural element as in claim 16 wherein the compliant material comprises an elastomer.

18. A variable-length structural element as in claim 1 wherein the axial compliance means is provided by forming each collet arm as a flexible spring.

19. A variable-length structural element as in claim 18 wherein the flexible spring is of serpentine configuration.

20. A variable-length structural element as in claim 1 wherein the collet arms are configured such that a change in axial length of the collet arms equal to the sum of the permissible axial displacement of the locking pin within the locking sleeve pin hole and the change in axial length change of the locking sleeve due to axial loading will not cause plastic deformation of the collet arms.

21. A variable-length structural element as in claim 1 wherein the collet fingers and the first end of the locking sleeve are configured for engagement in axial compression when the variable-length structural element is under tensile axial load.

22. A variable-length structural element as in claim 1 wherein the collet fingers and the first end of the locking sleeve are configured for engagement in axial compression when the variable-length structural element is under compressive axial load.

23. An adjustable-length bail extension comprising a variable-length structural element in accordance with claim 1.

24. An adjustable-length bail extension as in claim 23 wherein the second end of the outer member carries a link adaptor for connection to a lower end of a pipe elevator link suspended from a top drive on a drilling rig, and the second end of the inner member carries an elevator adaptor for connection to a link-mounting ear on a pipe elevator.

\* \* \* \* \*